United States Patent [19]

Bentson

[11] Patent Number: 4,535,688
[45] Date of Patent: * Aug. 20, 1985

[54] TORTILLA BASKET FRYER

[75] Inventor: Wade A. Bentson, San Francisco, Calif.

[73] Assignee: Amco Corporation, Chicago, Ill.

[*] Notice: The portion of the term of this patent subsequent to Jan. 22, 2002 has been disclaimed.

[21] Appl. No.: 633,610

[22] Filed: Jul. 23, 1984

Related U.S. Application Data

[63] Continuation-in-part of Ser. No. 553,369, Nov. 18, 1983, Pat. No. 4,494,453.

[51] Int. Cl.³ .............................................. A47J 37/12
[52] U.S. Cl. ........................................ 99/353; 99/403; 99/426; 99/428; 99/449; 99/450; 425/398; 426/496; 426/512; D7/43; D7/49
[58] Field of Search .......... 99/340, 403, 428, 410–418, 99/426, 449, 450; 425/383, 398, 399; 426/496, 512; D7/43, 356, 103, 99, 357, 361; 428/461

[56] References Cited

U.S. PATENT DOCUMENTS

| | | | |
|---|---|---|---|
| 902,181 | 10/1908 | Tidow | 99/411 X |
| 1,672,738 | 6/1928 | Stampley | 99/411 X |
| 2,570,374 | 10/1951 | Pompa | 99/416 |
| 2,635,528 | 4/1953 | Torres | 99/426 X |
| 2,719,480 | 10/1955 | Prickett | 99/426 |
| 3,020,826 | 2/1962 | Silva | 99/426 |
| 3,308,748 | 3/1967 | Jalbert | 99/426 X |
| 3,424,076 | 1/1969 | Bernatz | 99/426 X |
| 3,555,993 | 1/1971 | Garcia | 99/416 X |
| 3,604,342 | 9/1971 | Harding | 99/426 |
| 3,759,165 | 9/1973 | Wallace | 99/416 X |
| 3,874,914 | 4/1975 | Travis | 428/461 |
| 3,946,654 | 3/1976 | Janssen | 99/403 |
| 4,173,926 | 11/1979 | Brignall | 99/403 X |
| 4,181,073 | 1/1980 | Chapa | 99/416 |

FOREIGN PATENT DOCUMENTS

| | | | |
|---|---|---|---|
| 7733 | 5/1902 | Austria | 99/428 |
| 296603 | 11/1929 | Italy . | |
| 270274 | 12/1929 | Italy . | |
| 4026 | of 1901 | United Kingdom | 99/439 |

Primary Examiner—Billy J. Wilhite
Attorney, Agent, or Firm—Laff, Whitesell, Conte & Saret

[57] ABSTRACT

A deep frying basket has a pair of welded wire spring baskets which nest together to define a dish shaped space between them. A pair of more or less spaced parallel wires are welded to each of the wire spring baskets, one pair being welded to the inside bottom of the inner basket and the other pair to the outside bottom of the outer basket. In one embodiment, the two pairs are hinged together on one side of the baskets and formed into handles on the other side of the baskets. At least one pair of the wires is shaped to form a stand which facilitates a loading and unloading of a food product in the defined space.

17 Claims, 10 Drawing Figures

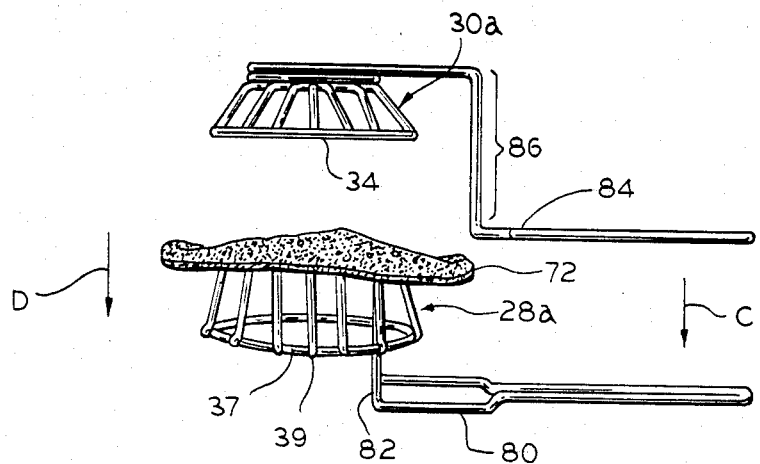
FIG. 7
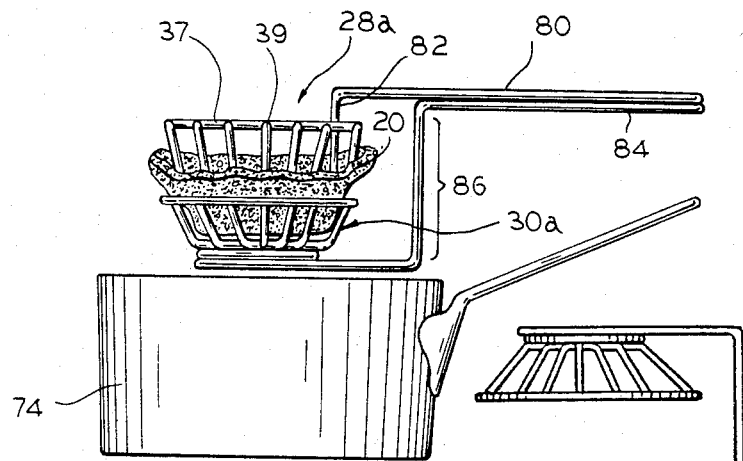
FIG. 8
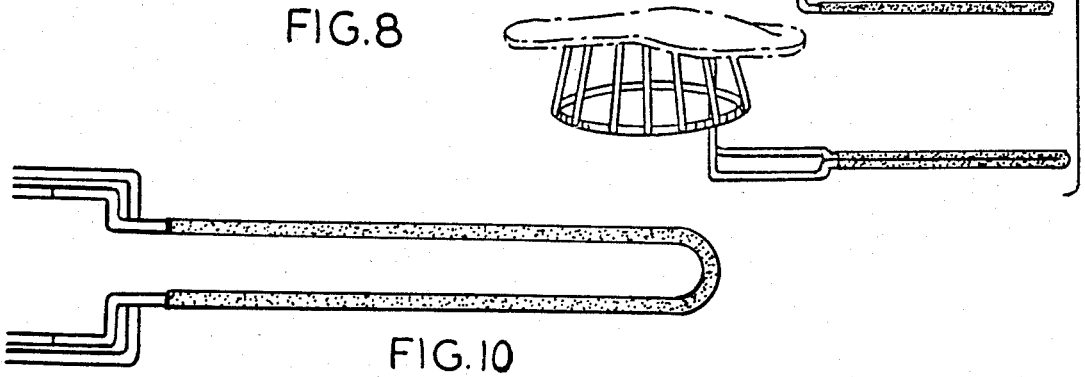
FIG. 9
FIG. 10

TORTILLA BASKET FRYER

This is a continuation-in-part of application Ser. No. 553,369, filed Nov. 18, 1983, now U.S. Pat. No. 4,494,453.

This application relates to means for and methods of deep frying food products and, more particularly, for deep frying foods (such as tortillas) having a generally basket or dish shape.

There are a number of foods which are deep fried under conditions where it is important to maintain them in the shape of a basket or a dish. For example, a tortilla shell or basket is sometimes formed into a deep fried basket, dish, or cup shape so that it may be filled with foods such as guacamole, refried beans, chile con carne, various sauces, and the like. The filling may be eaten, and then the tortilla dish holding the filling may also be eaten.

Another time when it is desirable to use a basket configuration for deep frying is in making especially crispy food. For example, if shreaded vegetables are arranged and held in a thin layer during the deep frying, they will generally become crisper than they would be, if fried in a heap contained within a deep basket.

Heretofore, a pair of strainer-like ladles have sometimes been nested, one in the other, to define a space between them for containing food in a deep dish configuration. Then, the pair of nested ladles, with the food held between them, are placed in a pan of heated oil. However, using such a pair of ladles is somewhat like eating with chopsticks in that it requires training, coordination, and experience in the simultaneous manipulation of several items. When this manipulation is done in hot cooking oil, it is possible either to be burned or to lose the food by dropping it in the oil. Therefore, a nesting pair of ladles is not necessarily capable of always making a perfect or nearly perfect tortilla basket especially when the user is not experienced in the use of the ladles.

Moreover, the use of such ladles is slow and awkward. The manner of loading, confining, and emptying foods in the nested ladles tends to slow production and to limit the end food product because it is necessary to hold at least the bottom one of the ladles in one hand while loading it with the other hand. After the ladle is loaded, it is necessary to pick up the other ladle, and to nest the bottom two ladles, while shaping the tortilla between them without tearing it.

After consideration is the appearance of the final food product. For example, a desirable shape for a tortilla basket is one of a dish having a generally scalloped side wall. This, in turn, requires a way of loading an unfried or unloading a deep fried tortilla without distorting its appearance. When both hands are occupied with coordinating two ladles, it is difficult to manually shape the tortilla clamped between the ladles.

Accordingly, an object of the invention is to provide new and improved equipment for deep frying food products such as tortilla baskets. Here, an object is to provide means for holding a dough or other vegetable product in a predetermined basket shape during deep frying. Still, another object is to provide a deep fried food product having a scalloped sidewall.

Yet another object is to provide an easy to use tortilla frying basket which is free standing so that both hands are free to shape the tortilla as it is being molded prior to frying.

In keeping with an aspect of the invention, these and other objects are accomplished by a nesting pair of deep frying baskets which may, in a first embodiment, be hinged together on one side with handles extending from the diametrically opposed side. In a second embodiment, the nesting pair of baskets are not hinged so that they may be completely separated from each other. In either embodiment, the nesting baskets define between them a space for receiving a food product. The first embodiment uses the hinged element and the handle of an outside or lower one of the nested baskets has a step and a vertical extension for giving a shape control for the finished food product. The inner or upper one of the nested baskets has a hinge element and a handle configuration which forms the legs of a stand which holds the inner basket at an elevated position to facilitate loading and unloading. In the second embodiment, legs are formed on only the handle side for the same purposes. When the two baskets are swung on their hinge or otherwise placed together in a closed position, the hinge and handles of the first embodiment or the handles alone of the second embodiment cooperate to hold the baskets in a spaced parallel relationship so that the food product may be captured and held in the resulting space between them. In either embodiment, the metal handles may be dipped in a liquid plastic which thereafter solidifies to provide heat insulation.

Two preferred embodiments of the invention are shown in the attached drawing, wherein:

FIG. 7 shows a second embodiment of the invention in a side elevation loading position;

FIG. 8 shows the second embodiment with the baskets nested in a cooking or deep frying position just prior to immersion in a pan of cooking oil;

FIG. 9 is a view, similar to FIG. 7, showing handles having a plastic heat insulating thereon; and FIG. 10 is a view in plan view of the heat insulated handles of FIG. 9.

Figure 1:
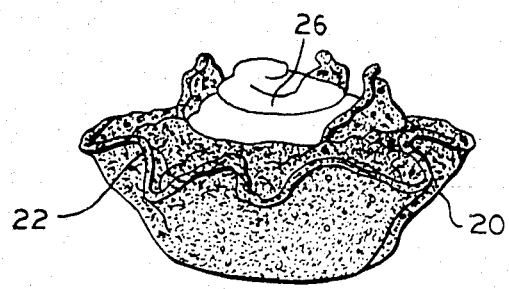
FIG. 1 shows an exemplary food product which is cooked in the inventive deep frying baskets.

The inventive deep frying basket makes a food product exemplified by the tortilla 20 of FIG. 1. The tortilla basket or shell 20 is preferably made from either corn or flour tortillas. A flat 6-inch tortilla makes a 4½-inch basket and an 8-inch tortilla makes a 6-inch basket. To mold the baskets, the tortillas must be fresh, moist and flexible. If it is necessary to soften them, they may wrapped in a foil pack which is moistened with water and placed in a 350° oven until steamy (about fifteen minutes). After the tortilla is placed in the inventive basket, it is preferably deep fried in lard because it is ideal for giving an additional flavor and texture. However, any good quality, fresh vegetable oil is also excellent.

Insofar as the invention is concerned, the important things to notice in FIG. 1 is that the finished tortilla shell 20 is in the shape of a basket with more or less vertical sides which are scalloped as at 22, for example, to give added strength and a pleasing appearance.

The tortilla shell 20 is here shown as being filled with a food, such as a guacamole dip 24, topped with a dressing 26. Appearance, strength, and ease of access to the dip are important to a successful food product, such as a tortilla, for example.

The first embodiment of the inventive deep basket fryer (FIGS. 2-4), comprises a nested pair of baskets 28, 30. Preferably, each of these baskets is made from chrome plated, iron or steel wire which is welded together. By way of example, the outer or lower basket 30 is shown in plan view in FIG. 5. The inner or upper basket 28 has essentially the same construction as the outer basket 30, except for its physical dimensions.

Basically, the basket (FIG. 5) has concentric inner and outer wire or rod rings 32, 34, at the bottom and the top rim of the basket, respectively. Eight separate wires or bars (one of which is cross hatched for easy identification) are bent into a hairpin shape. The bights of the hairpins come together at 35 to form the bottom of the basket 30. Each of these hairpins is bent, as at 36, for example, to change the basket shape from a flat bottom to a rising side wall. The hairpins are welded to the concentric rings 32, 34 near the edge of the bottom and at the rim of the basket. All of the wires (as at hairpin ends 38) are dress-off to give a smooth edge.

Figure 2:
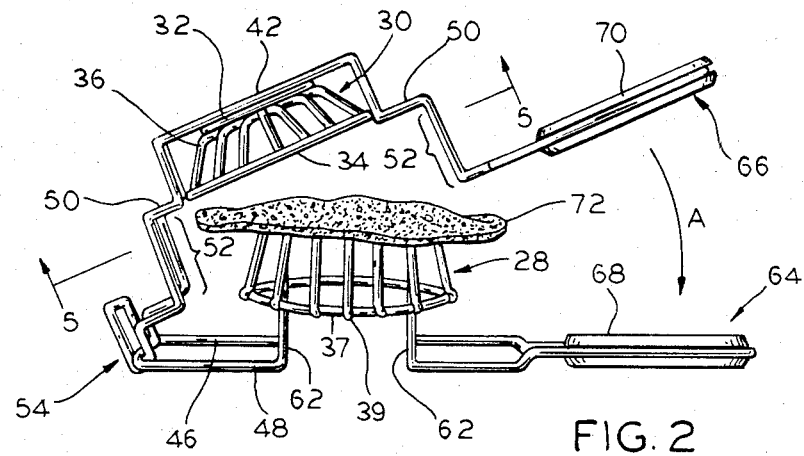
FIG. 2 shows a first embodiment of the inventive baskets in a loading position.
Figure 3:
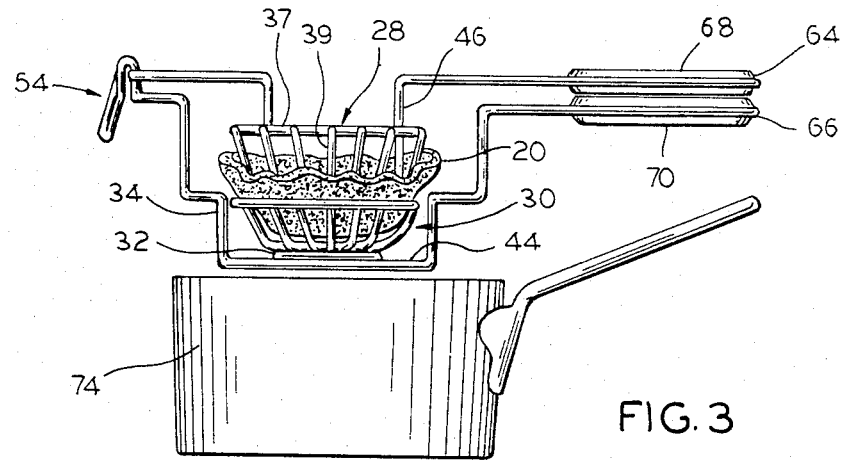
FIG. 3 shows the inventive baskets in a cooking or deep frying position just prior to immersion in a pan of cooking oil.
Figure 4:
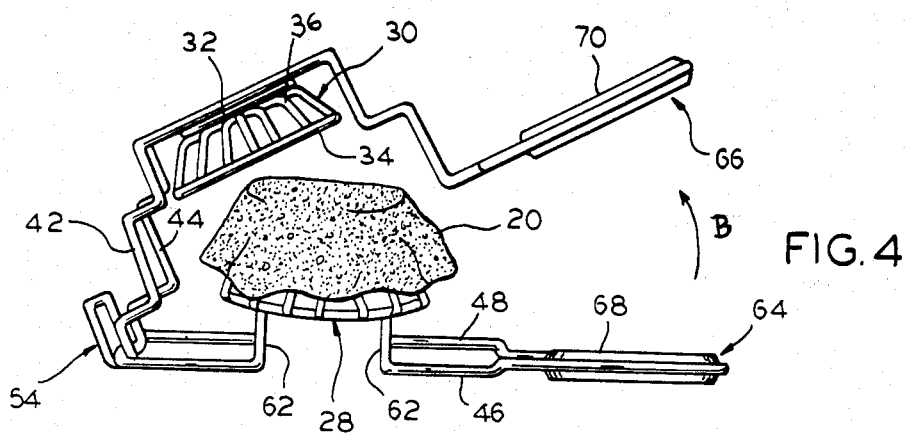
FIG. 4 shows the inventive baskets in an unloading position.
Figure 5:
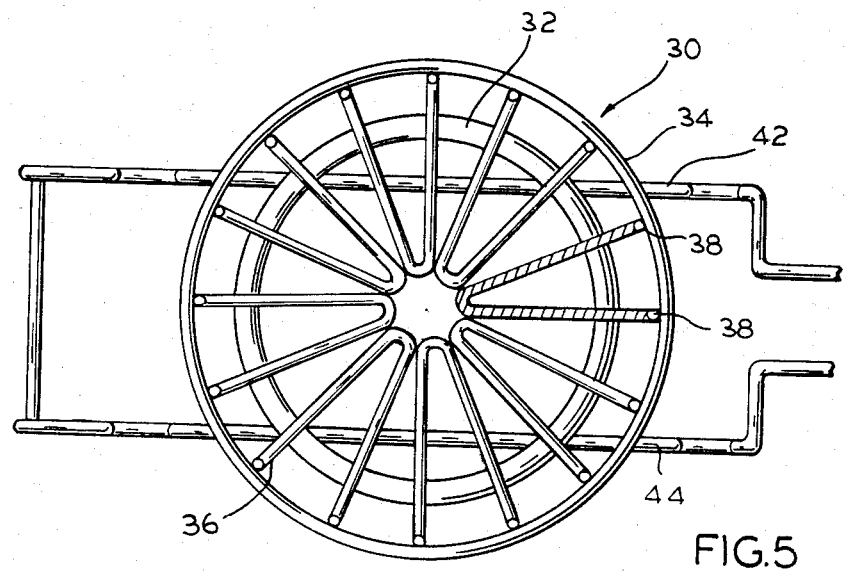
FIG. 5 is a plan view of the outer basket, by way of example, looking up from line 5—5 of FIG. 2.
Figure 6:
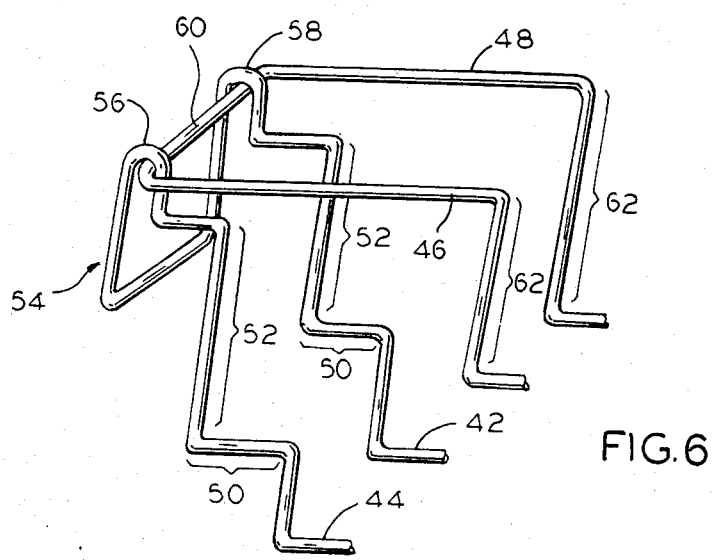
FIG. 6 shows the hinge ends of two pairs of spaced parallel wires which also form the two handles of the nested baskets.

It is important to note that the vertical parts of the hairpins form the inside of the lower basket (i.e. ends 38 are inside of ring 34). The same vertical parts of the hairpins form the outside of the inner basket (i.e. ends 39 are outside ring 37—see FIG. 2). Therefore, as seen in FIGS. 2-4, the vertical wires forming the sides of the two baskets 28, 30 are in a confronting relationship, thus tending to urge the tortilla into a dish configuration 9, 10. At some convenient point or points, the two pairs of wires 42–48 may be welded together to form independent upper and lower closed loops. In one embodiment, the upper pair 46, 48, is formed by one wire and the lower pair 42, 44 is formed by another wire. Each of these wires is bent back upon itself at the ends of handles 68, 70 and welded together in the hinge area 54.

The second embodiment of the invention is shown in FIGS. 7, 8, as being made of two baskets, which are totally separated from each other. The entire hinge section 54 of the first embodiment 15 missing from the second embodiment, along with the stand legs which it provides.

Some people may fine it easier to place the tortilla on top of the inner basket while holding the outer hinged basket in a raised position, as shown in FIG. 2. This, more or less, requires the user to load the tortilla in the basket with one hand while holding the raised basket with the other hand, as shown in FIG. 2. Other people may find it easier to load the inner one of the baskets if the top basket is completely removed and laid aside as shown in FIG. 7. Then, two hands may be used to load the tortilla.

In greater detail, this embodiment has an inner or upper basket 28a with a handle 80 which is long enough and heavy enough to counter balance the weight of the basket 28a and tortilla 72. Handle 80 has a vertically rising leg section 82 which holds the basket 28a in an elevated loading position. Therefore, handle 80 may be laid flat on a table top or other surface and the basket 28a is stable enough to allow the user to use two hands to lay the tortilla in place on top of the basket.

After the tortilla is in place, and while the handle 80 remains in place on the top of a table, the outer or lower basket 30a is placed over the tortilla 72, as shown in FIG. 7. Since the user was able to use two hands in enough to keep the sides of the tortilla from falling over and to maintain them in an upright position.

The two baskets are then inverted and set down into a deep dish of hot cooking oil in pan 74. The tortilla is formed into a crispy and crusty food product and is deep fried in the cooking oil.

After the cooking is completed, the tortilla basket is removed from pan 74. The baskets are inverted, and stood on the legs (FIG. 4) formed by vertical sections 62. The handle 70 is lifted in direction B, FIG. 4, so that outer basket 30 swings on hinge 54 to an open position. Then, the tortilla 20 is removed from the inner basket 28. Thereafter, it may be used in any suitable manner such as a basket or dish for dips, or other food.

The operation of the second embodiment is illustrated in FIGS. 7, 8. First, the basket 30a is laid aside and the basket 28a is placed with its handle 80 resting on a table or other surface. Basket 28a is then in an elevated position. The tortilla 72 is laid on top of basket 28a and preferably shaped around its outside contours with the hands. Next, the basket 30a is brought into place and positioned over the tortilla. The two baskets are held together by gripping the handles 80, 84 in one hand, and the combination is lowered into a pan 74 of boiling oil.

Those who are skilled in the art will readily perceive how to modify the invention. Therefore, the appended claims are to be be construed to cover all equivalent structures which fall within the true scope and spirit of the invention.

The claimed invention is:

1. A device for deep frying tortillas, said device comprising a nesting pair of inner and outer wire frame baskets, defining a somewhat dish shaped space being between them to receive and mold the shape of a food product, a pair of elongated handles extending from one side of each one of the baskets, the handle on at least the inner one of the basket being shaped to form a vertical stand for supporting and holding at least one side of said inner basket in a stable and inverted position to facilitate a loading and unloading of said food product in said dish shaped space.

2. The device of claim 1 and a hinged section formed on a side of said baskets which is opposite to said one side, said hinged section forming a vertical stand on said opposite side.

3. The device of claim 2 wherein said handle of said inner basket is a pair of wires attached to the inside of the bottom of said inner basket, said wires being bent into a shape for forming both said hinge and said stand.

4. The device of claim 1 wherein said handle of said inner basket is a pair of wires attached to the inside of the bottom of said inner basket.

5. The device of claim 1 wherein each of said nesting baskets is formed by a plurality of hairpin shaped wires bent to form a bottom and sidewall of said basket, the bights of said hairpin shapes coming together to form said bottom and the bent part of said hairpin parts rising vertically to form said sidewall of said basket, said vertical wires of said inner and outer basket being in a confronting relationship to form said food product received in said defined space into a dish having a scalloped sidewall.

6. The device of claim 5 wherein said handle of said inner basket is a pair of wires attached to the inside of the bottom of said inner basket, said wires being bent into a shape for forming said hinge and stand.

7. The device of claim 5 and a hinged section formed on a side of said baskets which is opposite to said one side, said hinged section forming a vertical stand on said opposite side, said handle of said outer basket being a pair of wires attached to the outside of the bottom of the outer basket, said wires being bent to form a step and a vertical extension to help control the shape of the food product.

8. The device of claim 7 and a pair of wooden handle inserts, one of said handle inserts being captured by an individually associated one of said pair of wires and the other of said handle inserts being captured by the other individually associated one of said pair of wires.

9. A nesting pair of deep frying baskets comprising handle means extending from sides of each of said pair of baskets, the nesting baskets defining between them a dish-shaped space for receiving a food product, the handle of an outside and normally lower one of the nested baskets having a configuration for providing a shaping control for the finished food product, the inner and normally upper one of the nested baskets having a handle configuration which holds at least the handle side of the inner basket in a stable, elevated and inverted position to facilitate loading and unloading, the handles cooperating to hold the baskets in a spaced parallel relationship when the two baskets are in a closed position, so that a food product may be captured and held in the resulting dish-shaped space between them.

10. The nesting pair of baskets of claim 9 and hinge means opposite said handle means, said hinge means cooperating with said handle to hold said inner basket at said elevated position.

11. A device for deep frying tortillas, said device having a pair of welded wire spring baskets which nest together to define a dish-shaped space between them, a pair of substantially spaced parallel wires welded to each of the wire spring baskets, each of said parallel wires being covered by a heat insulating material, one pair of said wires being welded to the inside bottom of an inner one of said baskets and the other pair of said wires beng welded to the outside bottom of an outer one of said baskets, the two pairs of said wires being hinged together on one side of the baskets and formed into handles on the other side of the baskets, one pair of the wires being shaped to form a stand which facilitates a loading and unloading of a food product in the defined space.

12. The device of claim 1 wherein said handles are covered by a heat insulating material.

13. The device of claim 1 wherein said handles are coated with plastic.

14. The device of claim 13 wherein said plastic is vinyl.

15. The baskets of claim 9 wherein said configuration of said baskets provides a step and a vertical extension for shaping the side walls of said food product formed in said dish shaped space.

16. The baskets of claim 9 wherein said handles are covered by a heat insulating material.

17. The baskets of claim 9 wherein said handles are coated with plastic.

* * * * *